United States Patent
Boveroux

(10) Patent No.: US 10,711,828 B2
(45) Date of Patent: Jul. 14, 2020

(54) TRANSMISSION SHAFT AND METHOD FOR PRODUCING SAME

(71) Applicant: BD Invent SA, Heure-le-Romain (BE)

(72) Inventor: Benoît Boveroux, Rocourt (BE)

(73) Assignee: BD Invent SA, Heure-le-Romain (BE)

( * ) Notice: Subject to any disclaimer, the term of this patent is extended or adjusted under 35 U.S.C. 154(b) by 429 days.

(21) Appl. No.: 15/509,702

(22) PCT Filed: Sep. 9, 2015

(86) PCT No.: PCT/EP2015/070569
§ 371 (c)(1),
(2) Date: Mar. 8, 2017

(87) PCT Pub. No.: WO2016/038072
PCT Pub. Date: Mar. 17, 2016

(65) Prior Publication Data
US 2017/0254355 A1    Sep. 7, 2017

(30) Foreign Application Priority Data
Sep. 9, 2014    (BE) .................................. 2014/0676

(51) Int. Cl.
*F16C 3/02*    (2006.01)
*B29C 53/56*    (2006.01)
(Continued)

(52) U.S. Cl.
CPC .............. *F16C 3/026* (2013.01); *B29C 53/56* (2013.01); *B29C 70/86* (2013.01); *B29L 2031/75* (2013.01); *F16C 2326/06* (2013.01)

(58) Field of Classification Search
CPC ....... B29C 53/56; B29C 70/30; B29C 70/866; B29C 70/86; B29L 2031/75; F16C 3/023;
(Continued)

(56) References Cited

U.S. PATENT DOCUMENTS 3,970,495 A * 7/1976 Ashton ................... B29C 33/52
156/162
4,704,096 A * 11/1987 Marek ..................... F04C 2/104
418/61.3
(Continued)

FOREIGN PATENT DOCUMENTS

CA    2839996 A1    12/2012
DE    3 408 650 A1    9/1985
(Continued)

OTHER PUBLICATIONS

Translation of DE 4111286. Schreiber, et al. Joint for fibre reinforced plastic cardan shaft—has serrated sleeve pressed on to thicker end with steeper fibre orientation. Oct. 24, 1991.*

*Primary Examiner* — Josh Skroupa
(74) *Attorney, Agent, or Firm* — Reinhart Boerner Van Deuren P.C.

(57) ABSTRACT

A method for producing a transmission shaft (1) comprising a body (2) made from composite and a coupling piece (3) at one end of the body (2), said coupling piece (3) being hollow and having splines (4) on the inner surface thereof, the base (6) of the splines (4) delimiting the perimeter of a circle of diameter D2 and the head (5) of the splines (4) delimiting the perimeter of a circle of diameter D1, characterized in that said method comprises the successive steps of: —providing a mandrel (10) having an expandable part (12) and a non-expandable part (11); —producing the body (2) by winding pre-impregnated fibre filaments around the mandrel (10); —positioning the coupling piece (3) around the body (2) on the expandable part (12) of the mandrel; —expansion of the expandable part (12) of the mandrel (10) in order to fill the base (6) of the splines (4) with the impregnated fibres of the body (2); —curing the body (2) provided with the coupling piece (3).

10 Claims, 4 Drawing Sheets

(51) Int. Cl.
*B29C 70/86* (2006.01)
*B29L 31/00* (2006.01)

(58) Field of Classification Search
CPC ...... F16C 3/026; F16C 2326/06; F16D 1/027; F16D 1/068; F16D 2250/0061; F16D 2250/0084; Y10T 403/7035
USPC ............................... 464/181–183; 403/359.6
See application file for complete search history.

(56) References Cited

U.S. PATENT DOCUMENTS

| | | | | |
|---|---|---|---|---|
| 5,320,579 | A * | 6/1994 | Hoffmann | F16C 3/026 |
| | | | | 464/181 |
| 5,851,152 | A * | 12/1998 | Ilzhofer | F16B 21/18 |
| | | | | 464/181 |
| 7,007,362 | B2 * | 3/2006 | Gibson | F16C 3/03 |
| | | | | 29/419.2 |
| 7,731,593 | B2 * | 6/2010 | Dewhirst | F16C 3/026 |
| | | | | 464/181 |
| 7,874,925 | B2 | 1/2011 | Dewhirst | |
| 7,963,853 | B2 * | 6/2011 | Brace | F16C 3/026 |
| | | | | 464/181 |
| 8,251,830 | B2 * | 8/2012 | Schreiber | F16C 3/026 |
| | | | | 464/181 |
| 2006/0258469 | A1 | 11/2006 | Dewhirst et al. | |

FOREIGN PATENT DOCUMENTS

| | | | | |
|---|---|---|---|---|
| DE | 3936999 A1 * | 5/1990 | | F16C 3/026 |
| DE | 4 111 286 A1 | 10/1991 | | |
| DE | 10 2011 053 480 A1 | 12/2012 | | |
| DE | 10 2011 085 962 A1 | 5/2013 | | |
| FR | 2 564 911 A1 | 11/1985 | | |
| JP | 3063583 B2 * | 7/2000 | | F16C 3/026 |
| WO | WO-2005113990 A1 * | 12/2005 | | F16D 1/068 |

* cited by examiner

TRANSMISSION SHAFT AND METHOD FOR PRODUCING SAME

PURPOSE OF THE INVENTION

The present invention relates to a transmission shaft and the manufacturing method used to produce said transmission shaft.

The present invention also relates to the coupling part designed to be positioned at one end of the body of the transmission shaft.

PRIOR ART

A transmission shaft is made up of a body and coupling parts arranged at the ends of the body that are intended to provide a link to a gearbox or a universal joint, for example. An example application in the aeronautical sector is the use of transmission shafts to actuate the flaps of the wings of an airplane. Another example application in the automotive sector is the use of transmission shafts between the gearbox and the rear axle of the vehicle.

It is known to make the body of the shaft from a composite material and to attach metal coupling parts to the body. Thus, documents U.S. Pat. No. 7,874,925 and US 2006/0258469 describe a method for producing a shaft with a composite tube and metal couplings pressed axially onto the ends of the polymerized tube. The couplings are provided with teeth designed to furrow troughs in the outer surface of the tube, thereby forming a mechanical link between the tube and the couplings. Forming such troughs generates debris that, in the case of document U.S. Pat. No. 7,874,925, is collected in the depressions machined beside the teeth in the coupling parts.

The main drawback of the method described in these documents is that the tube has to be damaged to attach the coupling part to the body of the shaft. This can introduce cracks that will grow during use. Furthermore, the presence of debris and of the depressions designed to collect the debris prevent perfect contact being achieved between the coupling part and the tube. The tube/coupling part assembly thus forms a structure with interstices and porosities that adversely affect the mechanical strength of the part over time, said part being more sensitive to environmental conditions (humidity, temperature variations, external damaging elements such as oils and deicers) and having lower fatigue strength when the direction of rotation is inverted. Furthermore, the tube and couplings form a mechanical assembly with different load-bearing zones on account of the different mechanical properties of the deformed tube and of the debris.

A method for manufacturing a connecting rod in which a hollow body that has not been cured (i.e. that can still be deformed) is retracted radially then slid into a tip is known from document DE 10 2011 053480. An inflatable element is then placed inside the entire body so that the ends of the outer surface of same match the inner surface of the tip. In other words, a soft sleeve-shaped body is inflated by applying pressure inside the body. The problem with this method is precisely controlling the degree of expansion, and therefore the internal diameter of the body. Without precise control, the internal diameter is liable to vary along the axis of the body, and between one run and the next. Tolerances are low in the aeronautical and other sectors. It is very important to be able to guarantee dimensions to within one tenth of a millimeter. Furthermore, since expansion occurs throughout the entire shaft, said expansion must occur inside a mold, which increases machining costs.

A method for manufacturing a shaft by filament winding and placing a fabric tube on a foam core is known from document DE 34 08 650. The core remains inside the shaft after manufacture. This means that the tool is lost with each part, and there is a weight gain, which is unacceptable in aeronautics. This method also has the drawback of requiring strengtheners and adhesives that are incompatible with the objective of achieving a uniform structure throughout the body, a uniform structure being recommended to prevent differential expansion problems inside the body of the shaft.

Objectives of the Invention

The present invention is intended to provide a method for manufacturing transmission shafts in which the whole of the body is held during attachment of the couplings to the ends of the body of the shaft.

The present invention is also intended to provide a method for producing a transmission shaft having precise geometric dimensions that are controllable throughout the method.

The present invention is also intended to provide a transmission shaft that has no interstices or porosity between the coupling and the body of the transmission shaft, and that has a uniform structure throughout the body.

Main Characteristic Elements of the Invention

The present invention relates to a method for producing a transmission shaft comprising a body made from composite and a coupling part at one end of the body, said coupling part being hollow and having splines on the inner surface thereof, the base of the splines delimiting the perimeter of a circle of diameter D2 and the head of the splines delimiting the perimeter of a circle of diameter D1,
characterized in that said method comprises the following successive steps:
- providing a mandrel having an expandable portion and a non-expandable portion,
- producing the body by winding pre-impregnated fiber filaments about the mandrel,
- positioning the coupling part around the body on the expandable portion of the mandrel,
- expanding the expandable portion of the mandrel in order to fill the base of the splines with the pre-impregnated fibers of the body,
- curing the body provided with the coupling part.

According to specific embodiments of the invention, the method includes at least one or a suitable combination of the following features:
- the coupling part is positioned about the body before the body is cured,
- the external diameter of the body formed by filament winding is slightly less than the diameter D1,
- the splines extend along the entire length of the coupling part,
- the inner surface of the coupling part has a groove extending perpendicular to the splines, and the expansion of the expandable portion of the mandrel also enables the groove to be filled with the pre-impregnated fibers of the body,
- the transmission shaft has a coupling part at each of the ends of same, and the mandrel comprises the non-expandable portion bookended at each end by the expandable portion.

The present invention also relates to a transmission shaft having a composite body and a hollow coupling part positioned about the body at one of the ends of same, the inner surface of said coupling part having splines, said composite body filling the splines entirely such as to ensure contact at every point between the body and the splines, leaving no interstices.

According to specific embodiments of the invention, the transmission shaft includes at least one or a suitable combination of the following features:
the splines extend along the entire length of the coupling part,
the inner surface of the coupling part has a groove extending perpendicular to the splines,
the groove or grooves extend around the entire perimeter of the coupling part,
the transmission shaft has a coupling part at each end of the body.

The present invention also relates to a hollow coupling part that has splines on the inner surface of same that extend along the entire length of the coupling part.

According to specific embodiments of the invention, the coupling part includes at least one or a suitable combination of the following features:
the inner surface of the coupling part has one or more grooves extending perpendicular to the splines,
the base of the splines is flat,
the heads of the splines are truncated.

Finally, the present invention relates to a transmission shaft that includes the coupling part described above.

SHORT DESCRIPTION OF THE FIGURES

Figure 1:
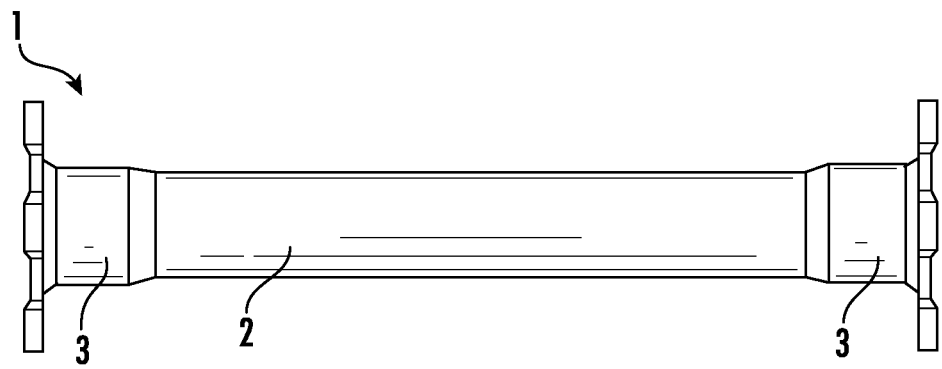
FIG. 1 is a side view of the transmission shaft according to the invention.

KEY (1) Transmission shaft
(2) Tube, also referred to as body of the transmission shaft
(3) Coupling part, also referred to as coupling
(4) Spline, also referred to as longitudinal groove, on the inner wall, also referred to as inner surface, of the coupling part
(5) Tooth, also referred to as spline head
(6) Spline base, also referred to as hollow
(7) Transverse groove
(8) Flange
(9) Fastening orifice
(10) Mandrel
(11) Non-expandable portion of the mandrel
(12) Expandable portion of the mandrel

DETAILED DESCRIPTION OF THE INVENTION

The present invention relates to a method for manufacturing a transmission shaft and the transmission shaft obtained using said method. The invention also relates to the coupling part positioned at one end of the shaft, the specific shape of this part enabling the part to optimize load-bearing when in use, and ensuring perfect contact between the coupling part and the body of the shaft.

The transmission shaft 1, as shown in FIG. 1, comprises a tube 2 made of composite material and a coupling part 3 positioned at each end of the tube 2. The coupling part 3 shown in FIGS. 2A, 2B, 3A, 3B and 3C is hollow and designed to be assembled about the tube 2. The cylindrical inner wall of the coupling part has a series of longitudinal grooves 4, also referred to as splines, extending parallel to the axial direction of the part along the entire length of the inner wall. More specifically, the splined inner wall has a succession of teeth 5 separated by a flat base 6. The opening at the head of the teeth is up to 55°, as shown in FIG. 3C at 13. The teeth are preferably blunted to prevent damage being caused to the fiber of the composite tube during manufacture of the shaft. Consequently, the apex of the tooth may have a truncated tip. The apex of the tooth 5, also referred to as the spline head, delimits the perimeter of a circle of diameter D1 (indicated R1 for radius 1) and the smooth base 6, also referred to as the spline base, delimits a circle of diameter D2 (indicated R2 for radius 2), as shown in FIG. 3B.

Furthermore, the inner wall of the coupling may have one or more transverse grooves 7 extending around the entire perimeter of the cylinder in a direction perpendicular to the longitudinal grooves 4, and intersecting the latter.

Figure 2A:
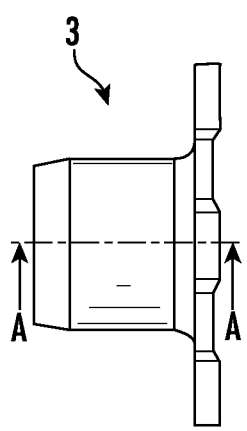
FIG. 2A shows a side view of the coupling according to the invention and FIG. 2B shows a cross section taken along the line A-A of FIG. 2A.
Figure 2B:
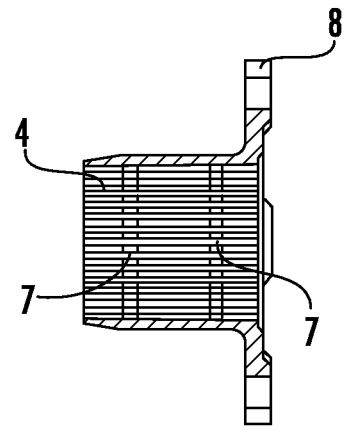
Figure 3A:
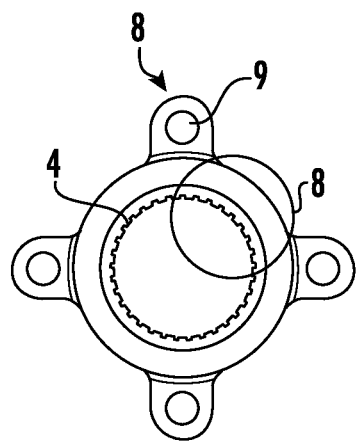
FIG. 3A shows a side view of the coupling according to the invention.
Figure 3B:
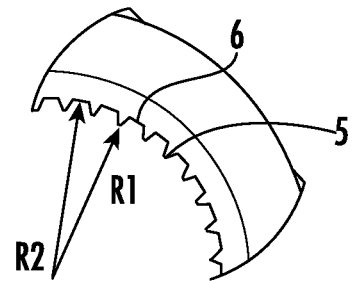
FIG. 3B shows a magnified view of zone B showing the radius at the head (R1) and at the base (R2) of the splines.
Figure 3C:
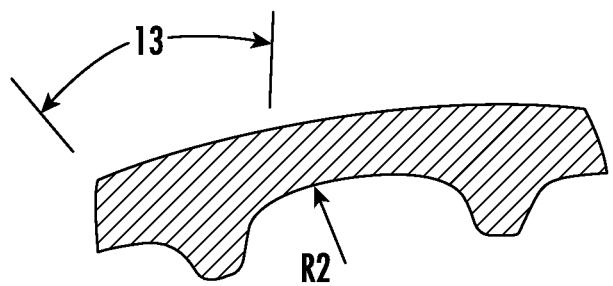
FIG. 3C shows a cross section showing the geometry of the splines.

The outer wall of the coupling is provided at one end with flanges 8 having orifices 9 for bolting, followed by a cylindrical portion in which the wall thickness is initially constant before narrowing toward the other extremity of the coupling part (see FIGS. 2A, 2B, 2C, and and 3A, 3B, and 3C).

According to the invention, the transmission shaft is produced as follows.

Figure 4:
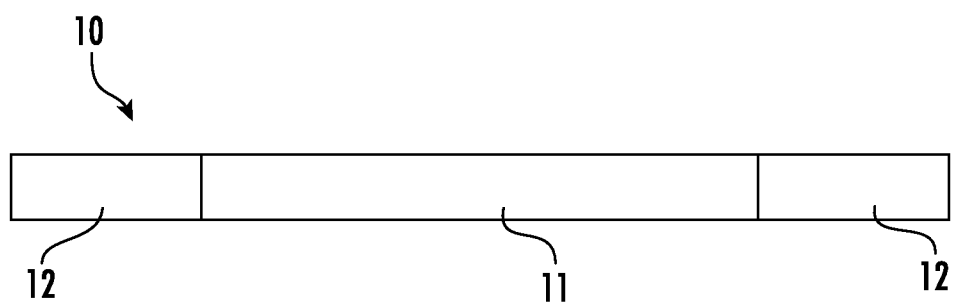
FIG. 4 shows an axial cross section of the three mandrels assembled according to the invention. The middle mandrel is not expandable and the mandrels on either side are expandable.
Figure 5:
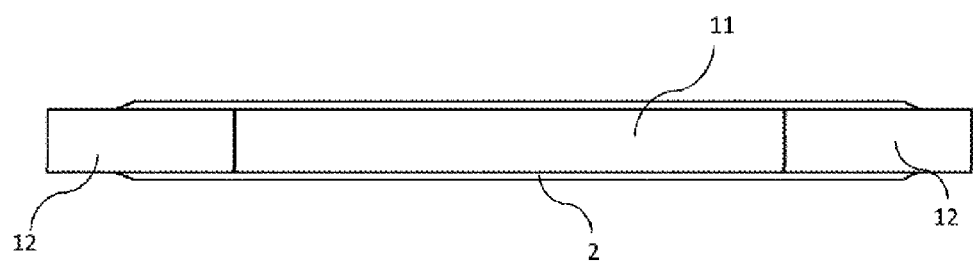
FIG. 5 shows an axial cross section of the tube according to the invention, obtained by filament winding about the three mandrels.

In a first step, the tube 2, also referred to as the body of the shaft, is made by filament winding of one or more layers of pre-impregnated fibers on a one-piece metal mandrel 10 having three portions, as shown in FIG. 4. This mandrel is rigid and has a Young's modulus that is greater than 60 GPa to precisely control the expansion of the mandrel during the third step, in order to obtain a body with an internal diameter that is perfectly constant along the axis of same. A first portion 11 of the mandrel is smooth and non-expandable and is bookended at each end by an expandable smooth portion 12. The three portions have the same diameter, which is the internal diameter of the tube to be produced. After filament winding of the fiber layers, the tube 2 shown in FIG. 5 is obtained. The external diameter of the tube is slightly less than the diameter D1 at the spline head, thereby enabling the couplings to be slid onto the tube in the second step without damaging same. At this stage, the tube has not yet undergone a curing cycle.

Figure 6:
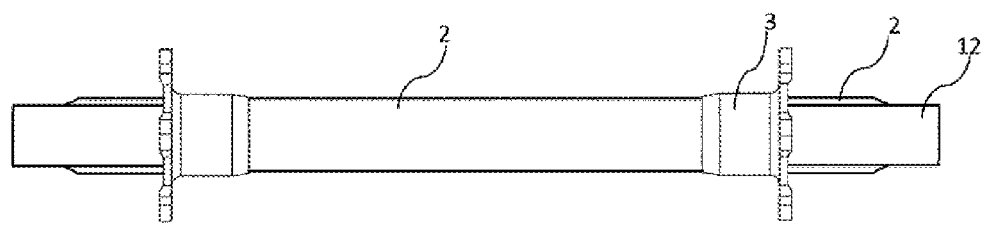
FIG. 6 shows an axial cross section of the coupling parts slid onto the tube, according to the invention.
Figure 7:
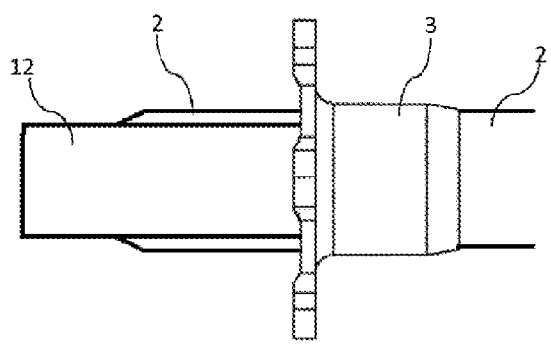
FIG. 7 shows a magnified view of one of the coupling parts in FIG. 6, attached about the tube.
Figure 8:
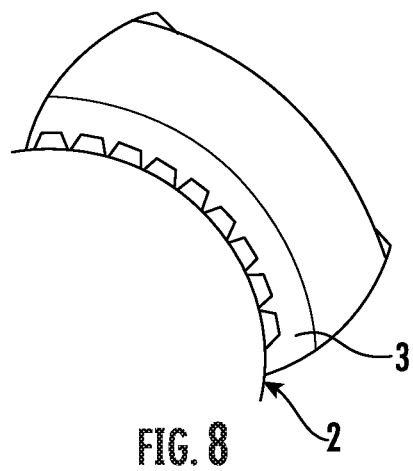
FIG. 8 is a partial view showing the position of the tube inside the coupling part before expansion of the expandable mandrel.

The second step involves placing the couplings 3 about the tube 2 at the expandable portions 12 of the mandrel (see FIGS. 6 and 7). The entire coupling part 3 is positioned about the tube 2 at or near to the ends, and a surplus of composite material 2 may be left behind the coupling part 3, as shown in FIGS. 6 and 7. During this step, the composite tube 2 is positioned inside the coupling 3, as shown schematically in FIG. 8. The tube 2 touches the head of the splines, but does not come into contact with the bases and the flanks of the splines.

Figure 9A:
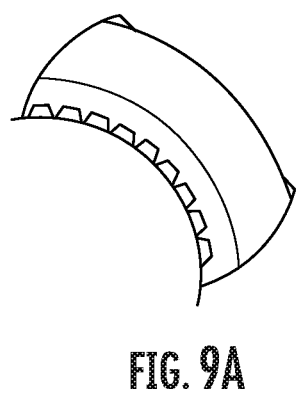
FIG. 9A shows a partial views of the position of the tube inside the coupling part, before expansion of the expandable mandrel
Figure 9B:
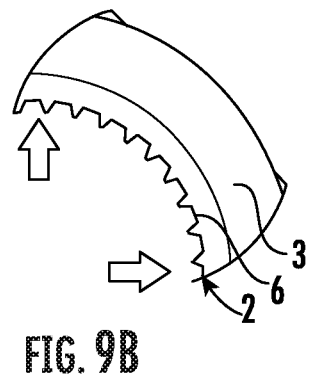
FIG. 9B shows a partial views of the position of the tube inside the coupling part after expansion of the mandrel.

The third step involves opening and expanding the expandable portion 12 of the mandrels. Opening the mandrels will force the fiber to enter the longitudinal grooves 4 all the way to the base 6 of the spline (see FIGS. 9A and 9B). Moreover, the fiber enters the transverse grooves, if the coupling part has any, which secures the coupling axially.

In a fourth step, the tube 2 is cured in order to polymerize the fiber pre-impregnated with resin and to complete the securing of the couplings.

Figure 10:
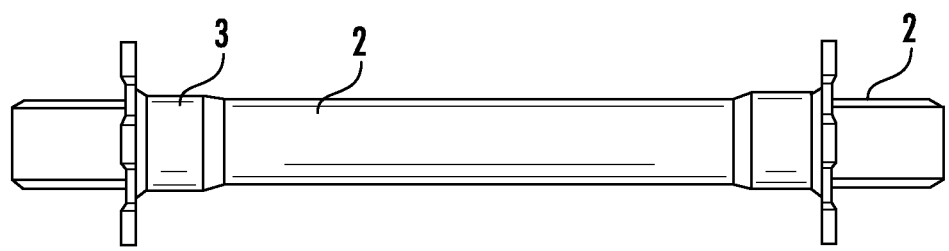
FIG. 10 shows the assembly according to FIG. 6 following removal of the mandrels.

The fifth step involves removing the mandrel (see FIG. 10).

Finally, the sixth step involves trimming the surplus from the composite tube 2 behind the flanges of the coupling part, if there is any surplus, in order to obtain the finished shaft in FIG. 1.

The drive shaft thus obtained is made of a composite material that entirely fills the spline of the coupling.

According to the invention and by way of example, the body of the transmission shaft is made using carbon fibers and the coupling is metal, synthetic or composite.

Finally, it should be noted that the method has been described for a shaft provided with a coupling part at each end. The present invention also covers a method for manufacturing a shaft provided with a coupling part at one end only, in which the other end may be a fork tip, for example.

Advantages of the Method, of the Transmission Shaft and of the Coupling Part According to the Invention The shaft benefits from the features provided by filament winding with a level of tension on the fiber that optimizes the mechanical properties of same while securing same by expansion, thereby ensuring perfect contact between the coupling part and the body. This perfect contact between the tube and the couplings means that no adhesive is required to improve adhesion. Furthermore, unlike the shafts in the prior art, no reinforcement is required inside the tube since it is not necessary to support the walls of the tube during the expansion step to prevent same from collapsing when positioning the coupling part.

Mechanical expansion using a rigid mandrel helps to precisely control expansion on the basis of the radial movement of the mandrel, unlike expansion by gas injection where control is provided by measuring pressure. Thus, the method according to the invention provides shafts with dimensions that are precise to 0.1 mm.

Furthermore, greater pressure can be applied via the radial movement of the mandrel. This results in the contact between the splines and the body having no porosity, even if the teeth are abrupt with a head opening angle equal to or less than 55°. This is not the case for gas expansion, where the profile of the teeth needs to be less abrupt to prevent interstices forming at the base of the teeth.

Furthermore, since expansion is only performed at specific points, the method does not require molding and only uses a single bar for tooling, which significantly reduces the cost of the tools required to implement the method.

The method according to the invention has the advantage that the fibers are formed during the third step before the resin has been polymerized. This means that the resin is still malleable. Such formation helps to establish perfect contact between the composite tube and the coupling. The pre-impregnated fibers fill the grooves without being damaged. This eliminates all risk of cracks appearing and spreading, and the shaft forms a uniform whole with no porosity.

No debris is generated during manufacture of the shaft. The coupling can therefore be formed exclusively on the inner surface of same by a spline with a base and a head without a rear zone designed to collect debris.

The longitudinal grooves enable the torsion load to be transmitted perfectly and with no play between the coupling and the composite tube. The grooves extend along the entire length of the coupling part, which helps to maintain perfect contact between the tube and the coupling part along the entire length of the latter, which is not the case in documents U.S. Pat. No. 7,874,925 and US 2006/0258469. This latter, a zone with no grooves, which could be referred to as an engagement zone, is required to freely place the coupling part about the tube, i.e. concentrically, before deformation of the tube in the grooved zone. Without this zone, a positioning tool would be required to ensure that the coupling part is correctly positioned before hollowing out the troughs in the tube.

The transverse grooves enable positioning and axial load bearing between the composite tube and the coupling, the number of transverse grooves depending on the longitudinal load to be absorbed by the coupling.

Furthermore and unlike document U.S. Pat. No. 7,874,925, the method for attaching the coupling parts to the composite tube and the geometry of the splines of the coupling parts do not generate residual stresses after assembly. This coupling part/composite tube linking principle obviates the need to position a washer inside the composite tube to prevent the composite wall from collapsing when transmitting torque. This is intended to reduce the weight of the assembly and to reduce manufacturing costs.

The fiber is continuous up to the end of the tube, unlike the transmission shafts in documents U.S. Pat. No. 7,874,925 and US 2006/0258469 where the fibers are cut at the extremities of the tube along the longitudinal surface of same, which weakens the material.

The invention claimed is:

1. A method for producing a transmission shaft (1) comprising a composite body (2) and a coupling part (3) at one end of the body (2), said coupling part (3) being hollow and having splines (4) on the inner surface thereof, the base (6) of the splines (4) delimiting the perimeter of a circle of diameter D2 and the head (5) of the splines (4) delimiting the perimeter of a circle of diameter D1, characterized in that said method comprises the following successive steps:
   providing a mandrel (10) having an expandable portion (12) and a non-expandable portion (11),
   producing the body (2) by winding pre-impregnated fiber filaments about the mandrel (10),
   positioning the coupling part (3) about the body (2) on the expandable portion (12) of the mandrel (10), expanding the expandable portion (12) of the mandrel (10) in order to fill the base (6) of the splines (4) with the pre-impregnated fibers of the body (2), curing the body (2) provided with the coupling part (3), removing the mandrel (10), wherein the transmission shaft (1) has a coupling part (3) at each of the ends of same, and wherein the mandrel (10) comprises the non-expandable portion (11) bookended at each end by the expandable portion (12).

2. The method as claimed in claim 1, wherein the coupling part (3) is positioned about the body (2) before the body is cured.

3. The method as claimed in claim 1, wherein the external diameter of the body (2) formed by filament winding is slightly less than the diameter D1.

4. The method as claimed in claim 1, wherein the mandrel (10) is metal.

5. The method as claimed in claim 1, wherein the splines (4) extend along the entire length of the coupling part (3).

6. The method as claimed in claim 1, wherein the inner surface of the coupling part (3) has a groove (7) extending perpendicular to the splines (4), and the expansion of the expandable portion (12) of the mandrel (10) also enables the groove (7) to be filled with the pre-impregnated fibers of the body (2).

7. A transmission shaft (1) having a composite body (2) and a hollow coupling part (3) positioned about the body (2) at one of the ends of same, the inner surface of said coupling part (3) having splines (4), said composite body (2) filling the splines (4) entirely such as to ensure contact at every point between the body (2) and the splines (4), leaving no interstices, the contact points being free of lubricant, characterized in that the splines (4) extend parallel to the longitudinal axis of the body (2) to optimize torsional load bearing.

8. The transmission shaft (1) as claimed in claim 7, wherein the splines (4) extend along the entire length of the coupling part (3).

9. The transmission shaft (1) as claimed in claim 7, wherein the inner surface of the coupling part (3) has a groove (7) extending perpendicular to the splines (4).

10. The transmission shaft (1) as claimed in claim 7, including a coupling part (3) at each end of the body (2).

* * * * *

UNITED STATES PATENT AND TRADEMARK OFFICE
CERTIFICATE OF CORRECTION

PATENT NO. : 10,711,828 B2
APPLICATION NO. : 15/509702
DATED : July 14, 2020
INVENTOR(S) : Benoit Boveroux Page 1 of 1

It is certified that error appears in the above-identified patent and that said Letters Patent is hereby corrected as shown below:

In the Claims

Column 8 (Line 10) Claim 7, Line 7 incorrectly reads "interstices, the contact points being free of lubricant," but should read -- interstices, the contact points being free of adhesive or lubricant, --

Signed and Sealed this
Eighth Day of September, 2020

Andrei Iancu
*Director of the United States Patent and Trademark Office*